Figure 1:
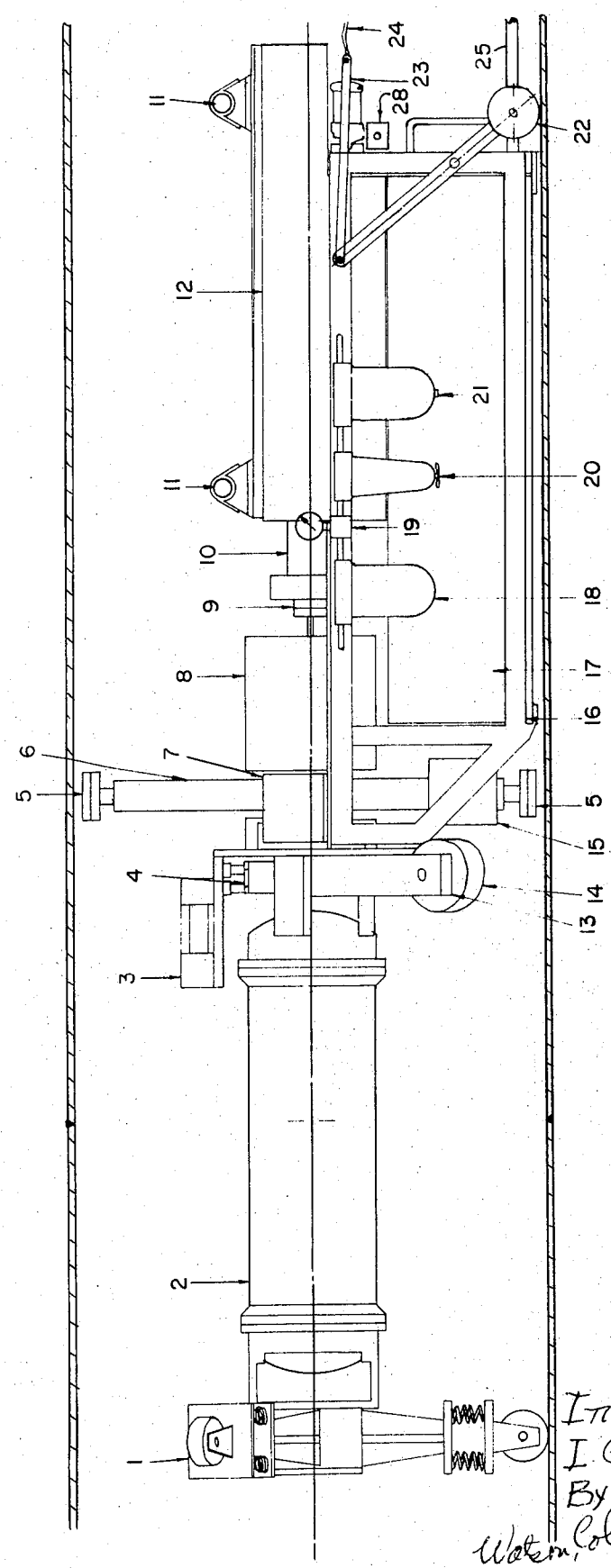

United States Patent [19]

Redmayne

[11] 3,764,806
[45] Oct. 9, 1973

[54] RADIOGRAPHIC EXAMINATION OF PIPE JOINTS
[75] Inventor: Ian G. Redmayne, Leighton Buzzard, Bedfordshire, England
[73] Assignee: B.I.X. Limited, Buzzard, England
[22] Filed: Apr. 14, 1971
[21] Appl. No.: 134,074

Related U.S. Application Data
[63] Continuation of Ser. No. 701,649, Jan. 30, 1968, abandoned.

[30] Foreign Application Priority Data
Jan. 31, 1967  Great Britain...................... 4,727/67

[52] U.S. Cl.......... 250/65 R, 250/106 R, 250/106 S
[51] Int. Cl. .......................................... G01n 23/00
[58] Field of Search ...................... 250/65 R, 106 R, 250/106 S

[56] References Cited
UNITED STATES PATENTS
3,492,477  1/1970  Arnesen............................ 250/65 R
2,742,259  4/1956  Boucher.......................... 250/65 R X Primary Examiner—Archie R. Borchelt
Attorney—Watson, Cole, Grindle & Watson

[57]  ABSTRACT

The specification of this application discloses improved methods and apparatus for radiographically examining welded joints in pipelines, during laying of such pipelines, using a signal source outside the pipe to automatically control the positioning of a self-propelled vehicle carrying a radiation source inside the pipe, such vehicle utilizing a source of compressed air, provided for the internal line-up clamp necessary in pipeline laying, to generate electricity for powering the electrical circuitry of the vehicle, thereby avoiding the necessity of trailing power supply cables in the pipeline in addition to the compressed air line.

6 Claims, 5 Drawing Figures

RADIOGRAPHIC EXAMINATION OF PIPE JOINTS

This application is a continuation of Ser. No. 701,649, filed Jan. 30, 1968, and now abandoned.

This invention concerns methods of and apparatus for radiographic examination of structures, particularly through not exclusively applicable to the examination of pipe joints.

The usual practice in laying pipe lines of large diameter, e.g., 12 inches diameter and upwards, whether on the sea bed or on land, usually buried, is to weld sections together end to end. To speed up operations, it is usual to effect the welding in stages, say four, one at each successive joint, each stage being effected round the whole periphery. When a new section is juxtaposed, it is aligned with the pipe line by means of a compressed-air-operated so-called line-up clamp which holds the section correctly located while the first stage weld is effected.

It is a routine practice to examine each weld when it is completed, suitably by radiography, to ensure that it meets the technical requirements specified. This has hitherto been effected from outside the pipe. Thus for example a photographic film has been wrapped round 120° of the weld and a beam of X-rays of an angular width of 60° directed through the pipe from the symmetrically opposite point. This necessitates penetration of the beam through two thicknesses of metal and a maximum distance of the film from the source equal to the diameter of the pipe at the centre of the length of the film, the distance falling towards the end to a value of about 0.87 times the diameter. It also necessitates three distinct operations for each weld.

Proposals have been made to locate the radiation source within the pipe thus enabling the whole weld to be radiographed in a single operation, at the same time making it necessary for only one thickness of metal to be penetrated and reducing the distance from the source to the film. Such location also protects the source and reduces radiation hazard. The presence of the line-up clamp however makes manipulation of the source to the correct position along the pipe line and the transmission of electrical energy to it a matter of great difficulty if not a practical impossibility.

The present invention provides for the only energy supply to the radiation source to be in the form of compressed air, and for the source to be self-locating along the pipe line by reference to a local external radiation source which can readily be placed or held against the outside of the pipe line in an appropriate position in relation to the weld to be radiographed.

So far as necessary, for example in the case of an X-ray source, a supply of electricity is furnished by batteries which are kept charged by an air-motor operated generator.

The line-up clamp presents no difficulties in supplying compressed air to the radiographic unit because the clamp incorporates a compressed air reservoir to which the unit can be connected. A constant supply is in any event connected to the clamp and the energy consumption of the radiographic unit will be quite small compared with that of the clamp.

According to one aspect of the invention there is provided a method of radiographically examining the wall of a hollow structure by means of a radiation source carried by a self-propelled vehicle within said structure comprising positioning a signal source adjacent the exterior of the structure in predetermined positional relationship to a portion of the wall structure to be examined and automatically positioning said vehicle by reference to said signal source so that the radiation source is aligned with said portion of the wall structure and exposing said radiation source when so positioned to produce a radiograph of said portion of wall structure.

According to another aspect of the invention there is provided apparatus for radiographically examining the wall of a hollow structure from within said structure said apparatus comprising a self-propelled vehicle carrying a radiation source, electrically operated control means for controlling the operation of said apparatus in accordance with a predetermined programme, a fluid pressure operated electric generator connected to energise said control means, and fluid pressure connection means for connecting said generator to an external supply of pressure fluid.

Figure 2:
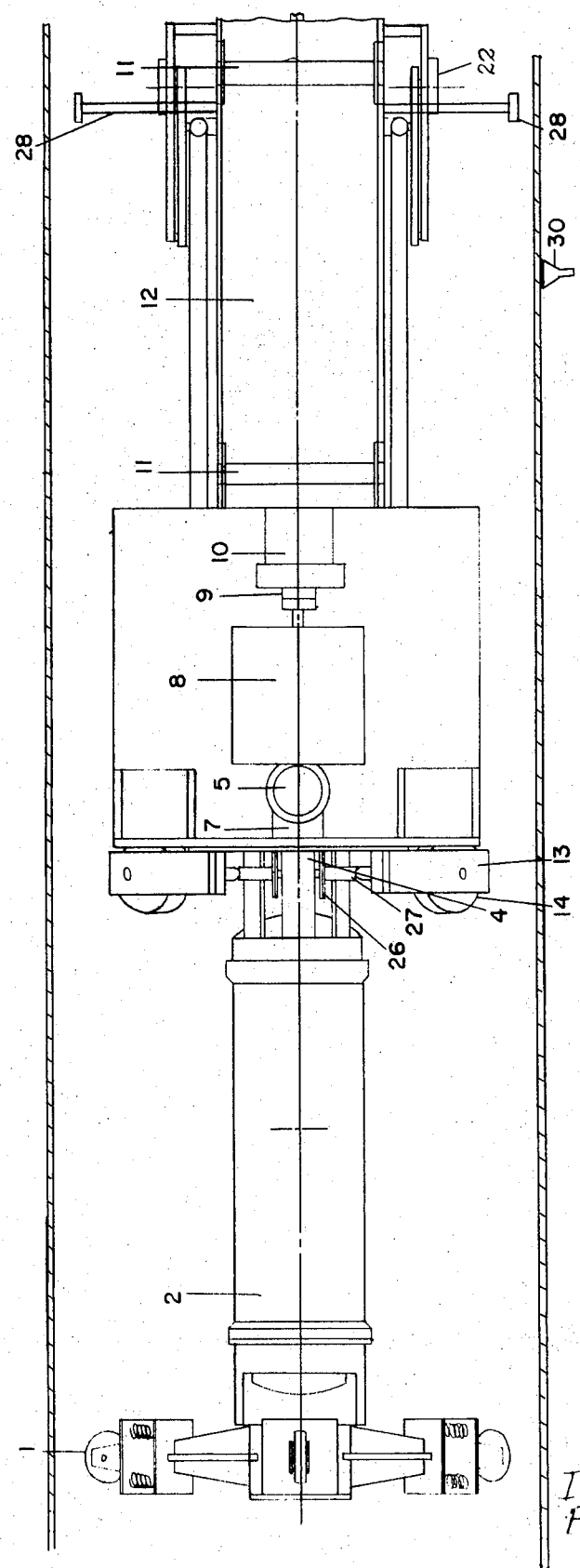
Figure 3:
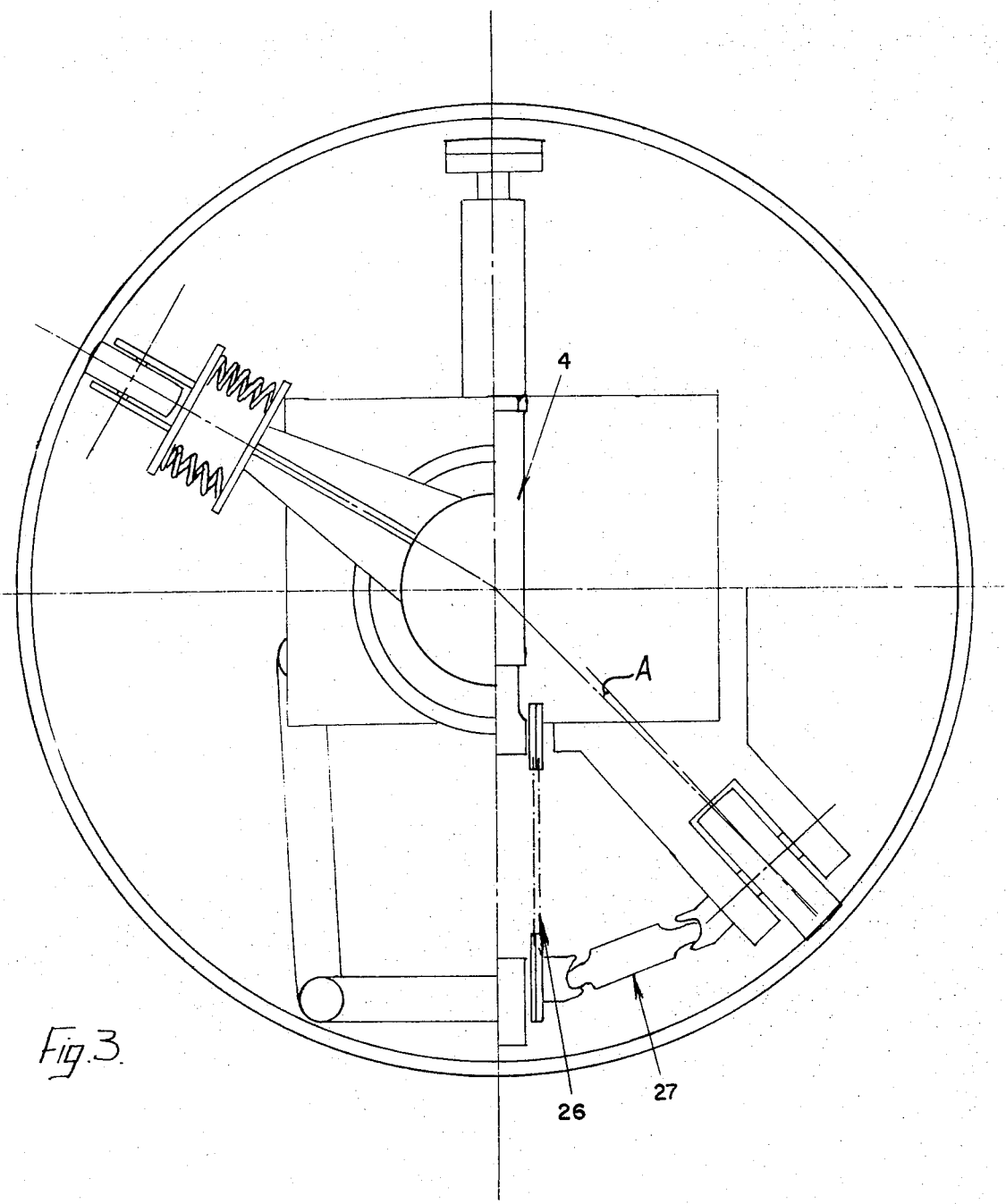
Figure 4:
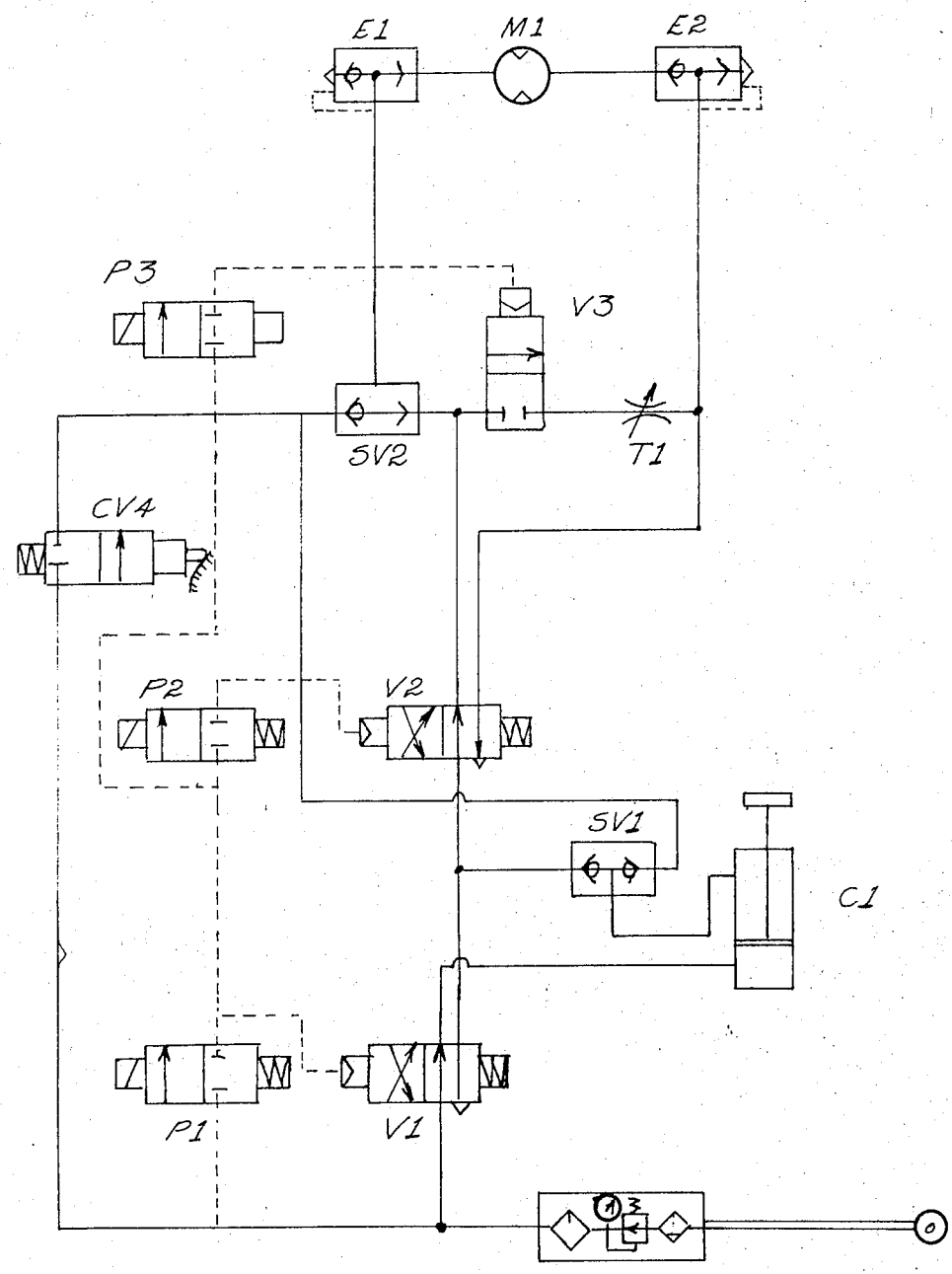
Figure 5:
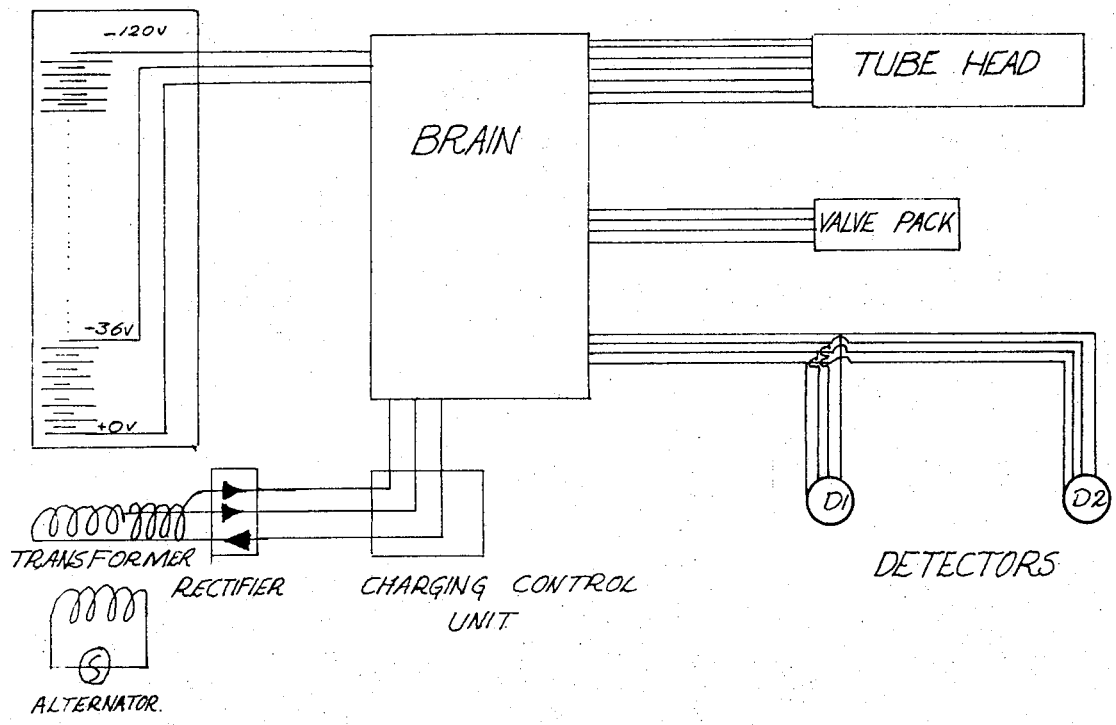

The various features and advantages of the invention will be apparent from the following description of an exemplary embodiment of apparatus according to the invention illustrated in the accompanying drawings of which:

FIG. 1 is a side view of the self-propelled vehicle of the invention located within a pipe, FIG. 2 is a view similar to that of FIG. 1 but taken from above, FIG. 3 is an end view taken from the left hand end of FIG. 1, FIG. 4 is a schematic diagram of the pneumatic control arrangements of the apparatus of FIG. 1 and FIG. 5 is a schematic diagram of the electrical control arrangements of the apparatus of FIG. 1.

The vehicle shown in the drawings comprises a main frame or chassis assembly 16 to one end of which is bolted a radiation source 2 and on the free end of source 2 is pivotally mounted a spider assembly 1 having three legs spaced 120° apart each terminating in a coil spring resiliently mounting a yoke for an idler wheel or roller. When the vehicle is inserted in a pipe having the internal diameter for which the vehicle is designed the three rollers of the spider assembly 1 resiliently engage and roll on the inner surface of the pipe and support the vehicle substantially centrally of the pipe at one end.

The arrangement of the brackets 13 and traction wheels 14 is such that the centre line through each wheel is at a small angle A (FIG. 3) to the radial direction from the longitudinal axis of the vehicle and each wheel is tired with a resilient wear-resistant material. The small angle is of the order of 3°–5° and the effect of this camber angle is that when the traction wheels move along a uniformly curved surface such as the interior surface of a pipe, each traction wheel tends to rotate the whole vehicle about its longitudinal axis but the two traction wheels exert this tendency in opposite senses. Thus when the vehicle is in correct vertical orientation with the two traction wheels symmetrically disposed about the vertical centre plane of the vehicle, the rotative tendency of the two wheels is equal and being in opposite senses cancels out. If, however the vehicle departs from such correct orientation the rotative force exerted by one wheel exceeds that exerted by the other in a sense causing the vehicle to rotate back towards correct orientation.

At the inner end of the radiation source 2 the chassis assembly 16 carries a pair of brackets 13 the ends of which are bifurcated to form yokes for a pair of traction wheels 14 the shafts of which are coupled by means of constant velocity universal couplings 27 to a common drive shaft carrying sprockets engaged by a pair of duplex drive chains 26 which pass around these sprockets and also round sprockets on the output shaft of an air driven reversible traction motor 4.

A propulsion control unit 3, comprising a pack of interconnected pneumatic valves of which the arrangement is shown in FIG. 4, is mounted on the chassis 16 above the air motor 4 and this unit is supplied with compressed air from a compressed air line connected to the vehicle through a control arrangement consisting of a filter 21, a pressure regulator 20, a pressure gauge 19 and a lubricator 18 all mounted on the chassis 16. This control arrangement also supplies compressed air to a second air motor 10 the shaft of which is connected by a flexible coupling 9 to an alternator 8 which functions to generate electricity for maintaining in charged state a battery of chargeable electrical storage cells housed in a battery box 17 slung within the framework of the chassis 16. The output of the alternator 8 is fed to a rectifier and charging control unit 7 also mounted on the upper surface of the chassis 16.

A main braking system pivotally mounted on the chassis 16, comprises a brake cylinder 15 on the lower end of a brake arm 6 which carries a brake pad 5 at its upper end, the piston of the brake cylinder 15 also carrying a brake pad 5 at its lower end.

When the main braking system is operated by the application of compressed air to one side of the double acting piston in brake cylinder 15 the piston moves downwardly to engage the lower brake pad 5 with the wall of the pipe in which the vehicle is located, and continued application of air pressure causes the braking system to act as a pneumatic jack and lift the vehicle off its traction wheels 14 until the upper brake pad 5 engages the top interior surface of the pipe. The vehicle is now supported by the spider assembly 1 and the main brake assembly both of which are pivotally attached to the chassis 16 so that if the vehicle is out of correct orientation at the time the main braking is applied the chassis is free to rotate back to correct vertical orientation under its own weight.

An electronic control unit or brain 12 which controls the operation of the radiation source 2, the pneumatic valve pack 3 and the charging control unit 7 is supported on the chassis 16 above the battery box 17 and carries on its upper surface a spaced pair of signal detectors 11.

An auxiliary braking system designed to hold the vehicle against movement in the event of failure of the compressed air supply is mounted on the chassis 16 at the end of the battery box 17 and is linked with a draw-bar linkage assembly provided for recovery of the vehicle from the inside of a pipe by a recovery line 24. This line is attached to a draw-bar which is pivotally connected to one end of each of a pair of arms which carry rollers 22 at their opposite ends and are pivotally attached to the chassis 16 at points approximately one third of the length of such arms above the centres of rollers 22. The auxiliary braking system includes a brake cylinder 23 which, when supplied with compressed air retracts the brake pads 28 from engagement with the side walls of the pipe against which such pads are urged by springs. When the air pressure fails the springs ensure that the brake pads 28 are applied and hold the vehicle against movement. The draw-bar to which the recovery line 24 is attached is linked to the auxiliary braking system to act in the same manner as the cylinder 23 so that when the recovery line is pulled with sufficient force the brake pads 28 are retracted. At the same time the pull on the recovery line in moving the draw-bar towards the right in FIG. 1 also pivots the arm carrying the rollers 22 so that such rollers which normally slidingly engage the inside surface of the pipe, pivots under the chassis 16 and raise the vehicle off the traction wheels 14 having it free to be towed out by the recovery line 24 until supported only on the rollers of the spider assembly 1 at one end and the rollers 22 at the opposite end.

The inter-relationship between the pneumatic valve of the valve pack 3 is shown in diagrammatic form in FIG. 4 wherein the supply of compressed air is shown to be applied by the regulator unit RU1 (which comprises the items 18–21 of FIG. 1) to operate the reversible traction motor M1 and brake cylinder C1 in a manner determined by electrical control signals applied to the valve pack by the electronic control unit 12 of FIG. 1. The valve pack comprises three solenoid operated spring released pilot valves P1, P2 and P3 each arranged when energised to actuate a corresponding one of three control valve V1, V2, and V3, a pair of shuttle valves SV1 and SV2 and a pair of rapid exhaust valves E1 and E2 and a cam operated valve CV4.

Assuming that no signals to energise the pilot valves P1 to P3 are being received from the electronic control unit, compressed air is being supplied to the valve pack, and the cam actuated valve is not actuated, then the compressed air is applied solely to the main brake operating cylinder C1 and the brake pads 5 of FIG. 1 are urged into operated position by the full pressure of the supply. The vehicle is thus held stationary.

When a control signal is applied to energise pilot valve P1 valve V1 is actuated to reverse the supply and exhaust connections to brake cylinder C1 through V1 and SV1, thereby releasing the main brake system, and at the same time compressed air is applied through valve V2 (unactuated) shuttle valve SV2 to close rapid exhaust valve E1 and drive motor M1 in the forward direction at full speed, the compressed air having passed through the motor M1 exhausting through exhaust valve E2 which is open at this time.

If instead of a control signal being applied to energise pilot valve P1 alone two control signals are applied to energise both pilot valve P1 and pilot valve P2, then the forward/reverse valve V2 is also actuated and the compressed air through valve V1 is now applied not through shuttle valve SV2 to valve E1 but directly to rapid exhaust valve E2 to close the latter valve and drive motor M1 in the reverse direction at full speed.

If now, in either of the previous two cases, a control signal is applied to pilot valve P3, slow/fast control valve V3 is actuated to provide a flow path for compressed air through a throttling disc T1. In the first case (forward drive) the operation of valve V3 provides a throttled by-pass circuit through V3, T1 and E2 (open) for the compressed air supplied to motor M1 which thus operates at reduced speed, and in the second case the operation of valve V3 provides a throttled by-pass circuit through T1, V3, SV2 and E1 (open) for the compressed air supplied to motor M1 which once again operates at reduced speed.

Thus by selective application of energising signals to the solenoid operated pilot valves P1 to P3 the motor M1 can be controlled to operate at either full or slow speed and in either forward or reverse direction at either speed.

The cam controlled valve CV4 provides an override control of the main brake system and traction motor in the event of malfunctioning of the electronic control system or the braking system which would otherwise leave the vehicle free to move. The cam of valve CV4 is connected to be actuated by tension in the recovery line 24 which would result if the vehicle started to move unintentionally in a direction opposite to the recovery direction. Actuation of the cam actuates valve CV4 to connect the compressed air supply through valve CV4 and shuttle valve SV2 to close valve E1 and operate motor M1 in the forward direction, and also through valves SV1 to the release side of the double acting brake control cylinder C1. This facility can also be utilized, in the absence of malfunction to provide for recovery of the vehicle without towing by the recovery line, the tension in such line resulting from a relatively light pulling being sufficient to cause the vehicle to move in the recovery direction under its own power.

The radiation source 2 of FIG. 1 is preferably an X-ray set of the known type giving a 360° radial emission, such for example as the Holger-Andreasen X-ray set Type 2281 which is capable of being operated from the battery of cells in the battery box 17. Alternatively such radiation source may be a body of radioactive material housed in a two-part radiation shield structure of which the plane of juncture of the two parts intersects the body of radioactive material, one such part being displaceable relative to the other by rotation of a lead screw to open a very small gap at the plane of juncture to serve as an exposure aperture for the emission of radiation from the radioactive body in a 360° radial pattern. The lead screw is arranged to be rotated by a motor controlled from the electronic control unit in the latter case and in the case of the X-ray set source the energisation of the X-ray set is arranged to be controlled by such control unit.

Referring now to FIG. 5 the electrical arrangements of the apparatus are there depicted in schematic form. They consist of the electronic control unit or brain which receives electrical power from the battery of cells over three lines carrying 0 volts −36 volts and −120 volts respectively. The other input to the brain is from two detectors D1 and D2 which are the signal detectors 11 of FIG. 1. The outputs of the brain are energising power and exposure control signals to the X-ray tube head serving as the radiation source, propulsion control signals to the pneumatic valve pack to control positioning of the apparatus and charging control signals for controlling the charging of the battery in accordance with the demand placed upon it by the operation of the X-ray tube and solenoid valves in the valve pack.

The brain unit itself is made up of conventional logical circuitry arranged to produce the required output control signals in response to different combinations of input from the two detectors D1 and D2 in accordance with a logical programme which is best understood from the following description of the operation of the apparatus when in use.

With the vehicle inserted in a pipe, it is positioned with the radiation aperture of the radiation source 2 in alignment with the joint to be radiographically inspected by means of a signal source 30, FIG. 2, manually positionable outside the pipe by an operator. This signal source comprises a torch of radiation shielding material containing a pellet of radioactive isotope material (Cobalt 60 for example) which can be exposed through a radiation lens to give a low power emission of conical form having a half-angle of approximately 45°. Such torch is first positioned on the outside of the pipe at a point equally spaced from the two signal detectors on the apparatus in the pipe so that each detector receives substantially the same level of radiation signal from the torch, and is then moved along the surface of the pipe in the direction it is required to move the apparatus. The effect of these two actions is firstly to cause the detectors D1 and D2 to apply equal inputs to the brain unit and an AND gate circuit within the brain unit responds to these equal signals to condition the unit for control action; and secondly to cause one detector only to provide an effective level of input signal to the brain. Taking for example the case where a signal from detector D1 alone indicates a requirement for movement in the forward direction, the movement of the torch from its initial central position towards detector D1 reduces the signal from D2 to zero and increases the signal from D1 to maximum. A logical circuit in the brain unit responds to the previous conditioning and to the signal from D1 alone to generate a control signal and apply such signal to energise pilot valve P1 in the pneumatic valve pack. As previously explained in connection with FIG. 4 this energisation of valve P1 alone causes the motor M1 to propel the vehicle in the forward direction at full speed.

The operator having moved the torch in the required direction removes it from the pipe and repositions it; or positions another similar torch, at a predetermined distance from the welded joint to be examined. The vehicle continues to move forwardly at full speed until detector D1 is again irradiated by the torch in its new position. This new input signal from detector D1 is responded to in the brain unit by a further logical circuit which was previously conditioned by the brain unit responding to the initial signal from D1 alone to generate a control signal and apply it to pilot valve P3 in the valve pack thereby causing the motor M1 to propel the vehicle at slow speed but still in the forward direction. Such slow speed forward movement eventually brings detector D2 into the radiation emission cone from the torch so that both detectors D1 and D2 now send equal input signals to the brain unit. When such equal signals are received during slow speed running another logical circuit in the brain unit removes the energising signal from pilot valve P1 thereby releasing valve V1 which reverses its connections and applies the main brake while removing the compressed air supply from the motor M1. The vehicle is thus arrested and provided the position of the torch is correct the vehicle is arrested with the exposure aperture of the radiation source exactly in alignment with the welded joint to be radiographed. For so long as the torch remains in position irradiating both detectors D1 and D2 the brain unit does not effect any further control action. This gives time for the operator to wrap a photographic film round the joint to be examined (if this has not already been done). When the operator is ready to cause an exposure to be made he simply removes the torch from the pipe thereby extinguishing the outputs from both detectors D1 and D2. The brain unit, by means of another logical circuit responds to this absence of input to set into operation a timing circuit set to yield an output control signal to activate the radiation source after a predetermined delay provided to give the operator time to move a safe distance away from the source before it exposes. In the case of an X-ray set this output control signal is effective to connect the necessary energising potentials from the battery to the X-ray set to cause the latter to make an exposure. In the case of a radioactive body type radiation source this output control signal is effective to energise the motor to rotate the leadscrew to make an exposure. In both cases the output control signal is further effective to restore the radiation source to quiescent state immediately the exposure has been made and to restore the logical circuits of the brain unit to the state in which such unit can only respond to equal signals from both detectors D1 and D2.

What is claimed is:

1. Apparatus of the self-propelled vehicle type for radiographically examining the wall of a pipe line from within said pipe line, comprising;
   a main frame,
   first and second traction wheels extending radially from said main frame and having a mounting non-rotatably secured to said main frame, said first and second traction wheels are respectively equally spaced on opposite sides of the gravitational plane extending through said main frame, said first and second traction wheels are each mounted to be cambered with respect to respective radial lines extending from the longitudinal axis of said main fame to the center of each of said first and second wheels whereby said first wheel and said second wheel each exert counter-rotative forces on said main frame tending to maintain the vertical orientation of said main frame with respect to said gravitational plane, said counter-rotative forces are substantially equal with said first and second wheels equally spaced from said gravitational plane and unequal with said first and second wheels unsymmetrically displaced with respect to said gravitational plane,
   auxiliary support means rotatably mounted in spaced relationship along said longitudinal axis from said first and second traction wheels for supporting said main frame within said pipe line,
   a fluid operated motor for driving said traction wheels,
   a radiation source, battery, a fluid pressure operated electric generator for charging said battery, and fluid pressure connection means mounted on said main frame for connecting said generator and said fluid operated motor to an external supply of pressure fluid,
   and means for controlling said fluid operated motor and said radiation source.

2. Apparatus as in claim 1 further comprising signal means positioned external to said pipe for generating position signals and wherein said means for controlling includes spaced signal detectors mounted to said main frame each emitting respective output control signals indicative of the positional relationship between the respective detector and said signal means, and control circuits responsive to a first pattern of outputs from said detectors to initiate propulsion of said support frame and responsive to a second pattern of said outputs to change the propulsion speed of said support frame to a second speed, and responsive to a third pattern of said output to stop said vehicle and initiate operation of said radiation source, and wherein said first speed is greater than said second speed.

3. Apparatus as in claim 1 further comprising a fluid pressure operated retractible brake member mounted to said main frame adjacent said non-rotatable mounting, and means for displacing said brake member between a retracted position in non-engaging relationship to the interior surface of said pipe wall and an operative position wherein said brake member engages said interior surface to lift said at least one pair of radially spaced traction wheels from engagement with said pipe wall thereby said main frame is supported by said auxiliary support means and said brake member so that said support frame rotates to a predetermined orientation about said longitudinal axis with said brake member in said operative position.

4. Apparatus as in claim 3 further comprising an auxiliary braking system including oppositely disposed brake members, means for normally retracting said oppositely disposed brake members from engagement with the interior of said pipe wall, means for biasing said brake members to frictionally engage the interior of said pipe wall, whereby failure of said means for retracting causes said brake members to frictionally engage said pipe wall to brake said main frame against movement.

5. Apparatus as in claim 4 further comprising retractible roller members mounted to said main frame for engaging the interior of said pipe wall to lift said first and second traction wheels from engagement with said pipe wall, means for extending said retractible roller members to engage said pipe wall, said means for extending also connected to said auxiliary braking system to retract said brake members with said retractible roller members contacting said pipe wall, and means connected to said means for extending to withdraw said main frame from within said pipe with the failure of said means for driving.

6. Apparatus as in claim 1 wherein the camber of each of said first and second wheels is in the range of 4° - 6°.

* * * * *